United States Patent
Van Bree et al.

(10) Patent No.: US 10,580,160 B2
(45) Date of Patent: Mar. 3, 2020

(54) DEVICE AND METHOD FOR DETERMINING A POSITION OF A MOBILE DEVICE IN RELATION TO A SUBJECT

(71) Applicant: KONINKLIJKE PHILIPS N.V., Eindhoven (NL)

(72) Inventors: Karl Catharina Van Bree, Eindhoven (NL); Leo Jan Velthoven, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 145 days.

(21) Appl. No.: 15/743,305

(22) PCT Filed: Jul. 14, 2016

(86) PCT No.: PCT/EP2016/066738
§ 371 (c)(1),
(2) Date: Jan. 10, 2018

(87) PCT Pub. No.: WO2017/012969
PCT Pub. Date: Jan. 26, 2017

(65) Prior Publication Data
US 2018/0204346 A1 Jul. 19, 2018

(30) Foreign Application Priority Data
Jul. 17, 2015 (EP) ..................................... 15177248

(51) Int. Cl.
*G06K 9/00* (2006.01)
*G06T 7/73* (2017.01)
*G06T 7/246* (2017.01)

(52) U.S. Cl.
CPC ............ *G06T 7/73* (2017.01); *G06K 9/00281* (2013.01); *G06T 7/246* (2017.01); *G06T 2207/30201* (2013.01); *G06T 2207/30204* (2013.01)

(58) Field of Classification Search
CPC ........ B26B 19/388; G06T 2207/30201; G06T 7/73; G06T 7/80; G06K 2009/3225; G06K 9/00281; G06K 9/00912; G06K 9/3216
See application file for complete search history.

(56) References Cited

U.S. PATENT DOCUMENTS 8,065,802 B2 11/2011 Oglesby
8,848,052 B2 9/2014 Fuchs
(Continued)

FOREIGN PATENT DOCUMENTS

WO 2013096572 A1 6/2013
WO 2013163999 A1 11/2013
(Continued)

OTHER PUBLICATIONS

Glocker Ben et al: "Real-time RGB-D camera relocalization", 2013 IEEE International Symposium on Mixed and Augmented Reality (ISMAR), IEEE, Oct. 1, 2013 (Oct. 1, 2013), pp. 173-179, XP032534740, DOI: 10.1109/ISMAR.2013.6671777.
(Continued)

*Primary Examiner* — Li Liu

(57) ABSTRACT

A device, system and a method for determining a relational position of a mobile device includes equipping the mobile device with a light source to project a light image on a subject during use, while a camera equipped device is observing the subject. The camera is used to identify both landmarks on the subject's face and the light image allowing the position of the mobile device relative to the user to be calculated. The system may use the computing power in the (Continued)

camera equipped device for image analysis, and no advanced processing needs to be performed by the mobile device. Further, no communication between the mobile device and the camera equipped device is required to establish the relative position of the mobile or personal care device.

20 Claims, 3 Drawing Sheets

(56) References Cited

U.S. PATENT DOCUMENTS

| | | | |
|---|---|---|---|
| 2005/0143645 A1 | 6/2005 | Vilsmeier | |
| 2008/0033410 A1 | 2/2008 | Rastegar | |
| 2010/0091112 A1* | 4/2010 | Veeser | G01B 11/002 348/207.1 |
| 2011/0018985 A1* | 1/2011 | Zhu | A45D 44/00 348/61 |
| 2013/0021460 A1* | 1/2013 | Burdoucci | A45D 44/005 348/77 |
| 2015/0197016 A1* | 7/2015 | Krenik | B26B 19/3806 83/13 |
| 2015/0332459 A1* | 11/2015 | Znamenskiy | G06K 9/228 348/136 |
| 2018/0271378 A1* | 9/2018 | Fright | A61B 5/0077 |

FOREIGN PATENT DOCUMENTS

| | | |
|---|---|---|
| WO | 2014144780 A1 | 9/2014 |
| WO | 2015001444 A1 | 1/2015 |
| WO | 2015067489 A1 | 5/2015 |

OTHER PUBLICATIONS

Shahram Izadi et al: "KinectFusion: Real-time 3D Reconstruction and Interaction Using a Moving Depth Camera", Oct. 16, 2011 (Oct. 16, 2011), XP055246992, Retrieved from the Internet: URL: http://dl.acm.org/citation.cfm?id=2047 270 [retrieved on Feb. 2, 2016].

P. Henry et al: 11 RGB-D mapping: Using Kinect-style depth cameras for dense 3D modeling of indoor environments 11, The International Journal of Robotics Research, vol. 31, No. 5, Feb. 10, 2012 (Feb. 10, 2012), pp. 647-663, XP055120449, ISSN: 0278-3649, DOI: 10.1177/0278364911434148.

Thomas Whelan et al: 11 ElasticFusion: Dense SLAM Without A Pose Graph 11, Robotics: Science and Systems XI, Jul. 13, 2015 (Jul. 13, 2015), XP055246993, DOI: 10.15607/RSS.2015.XI.001 ISBN: 978-0-9923747-1-6.

Paul McIlroy et al: 11 Kinectrack: Agile 6-DoF tracking using a projected dot pattern 11, Mixed and Augmented Reality (ISMAR), 2012 IEEE International Symposium on, IEEE, Nov. 5, 2012 (Nov. 5, 2012), pp. 23-29, XP032309047, DOI: 10.1109/ISMAR.2012.6402533 ISBN: 978-1-4673-4660-3.

Rogerio Schmidt Feris et al: 11 Detection and Tracking of Facial Features in Video Sequences 11, Jan. 1, 2006 (Jan. 1, 2006), Advances in Artificial Intelligence : MICAI 2000; Mexican International Conference on Artificial Intelligence, Acapulco, Mexico, Apr. 11-14, 2000; Proceedings; [Lecture Notes in Computer Science : Lecture Notes in Artificial Intelligence], Berli, XP019048636, ISBN: 978-3-540-67354-5.

Dantone MM et al: "Real-time facial feature detection using conditional regression forests", Computer Vision and Pattern Recognition (CVPR) , 2012 IEEE Conference on, IEEE, Jun. 16, 2012 (Jun. 16, 2012), pp. 2578-2585, XP032232375, DOI: 10.1109/CVPR.2012.6247976 ISBN: 978-1-4673-1226-4.

Wienss C. et al: "Sceptre—An Infrared Laser Tracking System for Virtual Enfironments", VRST'06. ACM Pymposium on Virtual Reality Software & Technology, Limassol, Cyprus, Nov. 1-3, 2006; pp. 45-50.

* cited by examiner

DEVICE AND METHOD FOR DETERMINING A POSITION OF A MOBILE DEVICE IN RELATION TO A SUBJECT

This application is the U.S. National Phase application under 35 U.S.C. § 371 of International Application No. PCT/EP2016/066738, filed on Jul. 14, 2016, which claims the benefit of European Application No. 15177248.0 filed on Jul. 17, 2015. These applications are hereby incorporated by reference herein.

FIELD OF THE INVENTION

The invention is related to a processing device for determining a position of a mobile device in relation to a subject, in imaging device including such processing device, a corresponding mobile device, a corresponding system including an imaging device and a mobile device, a method for determining a position of a mobile device in relation to a subject and a corresponding software product.

BACKGROUND OF THE INVENTION

US 2008/0033410 A1 discloses a method for automated treatment of an area of skin of a patient with laser energy. The method includes: identifying the area to be treated with the laser; modeling the identified area of the skin to be treated; and controlling the laser to direct laser energy to within the modeled area of the skin.

For many personal care products there is a wish to track the location of such personal care product, so, for example, is may be determined or detected where the related treatment has been applied. Applications range from shaving, styling, IPL epilating, skin cleansing to brushing teeth, to name only a few.

Hair cutting or trimming systems using a position of a hair cutting or trimming device in relation to the subject obtained by means of reference points attached to the head of the subject or user are discussed, for example, in WO 2013/096572 A1 and WO 2013/163999 A1. The additional and separate equipment needed in such system, however, render the process of hair cutting or trimming quite cumbersome, wherein furthermore without proper adjustment or calibration the results may be unreliable.

Other approaches on device localization are attempted by embedding accelerometer and gyro sensors in the device, while such sensors may significantly increase costs and complexity of such equipped device. In addition, even if the accelerometer and gyro information may provide for positional and movement information of the device, the relation to the subject or user is not established.

Tracking treatment (shaving, styling, epilating, cleaning, etc.) is related to tracking the relative location of the appliance to the face.

Straight forward device position tracking only provides the orientation and or position of the device itself and without knowing the users' location.

Remote tracking of the device with a camera in a consumer scenario is a very challenging task due to lighting and also due to device occlusion by the hand holding the device.

Tracking a device with a simple camera is a large challenge because of arbitrary occlusion of the device by the hand that is holding it. An attempt of limiting the movement of the user such that the device may not be occluded is quite futile.

Tracking of the applied treatment in a consumer setting is very challenging because of large variations in lighting conditions. In particular in connection with the frequent occlusions, the overall conditions (in particular the lack of control thereof) severely limit the reliability of such approach, at least for consumer settings.

SUMMARY OF THE INVENTION

It is an object of the present invention to provide for a determining of a relative position of a mobile device to a subject while overcoming or at least mitigating the above mentioned shortcomings, in particular avoiding cumbersome additional equipment and providing for an improved reliability also in an uncontrolled surrounding like a consumer scenario.

In a first aspect of the present invention a processing device for determining a position of a mobile device in relation to a subject is presented, the processing device comprising an input unit arranged to receive an image showing at least a portion of the subject, the image being taken by an imaging device provided separately from the mobile device, a feature detecting unit arranged to detect one or more body features of the subject in the received image, an indicator detecting unit arranged to detect at least one indicator in the received image, the indicator being a signal projected by the mobile device on the subject, and a processing unit arranged to determine the position of the mobile device in relation to the subject directly by processing the detection results of the one or more detected features and the detected indicator.

In a further aspect of the present invention a method for determining a position of a mobile device in relation to a subject is presented, comprising the steps of receiving an image showing at least a portion of the subject, the image being taken by an imaging device provided separately from the mobile device, detecting one or more body features of the subject in the received image, detecting at least one indicator in the received image, the indicator being a signal projected by the mobile device on the subject, and determining the position of the mobile device in relation to the subject directly by processing the detection results of the one or more detected features and the detected indicator.

The inventors realized that the challenges of obtaining not only the position of the mobile device, the optical tracking of the device and the varying lighting conditions may be addressed by combining a robust face feature tracking a with robust camera based detection of a controlled applied lighting in relation to the treated surface or subject.

Even though face feature tracking is mentioned above, it is to be noted that the invention is not limited to using facial features as features of the subject to be detected in the received image. In contexts where the mobile device is a personal care product, other body parts are considered as well, for example legs in a case of (IPL) epilating.

In particular, one embodiment of this invention provides for equipping the personal care device (mobile device) with a light source to project a light image on the user during use and to have a camera equipped device (smart phone, tablet, smart mirror) observing the user. The camera is used to identify both landmarks (e.g. on the user's face) and the light image allowing the position of the device relative to the user to be calculated. This system may in particular use the computing power in the camera equipped device for image analysis, and no advanced processing is required to be performed by the personal care device. Further, no communication between the personal care device and the camera equipped device is required to establish the relative position of the personal care device with respect to the user.

In an exemplary implementation, three elements are provided:

- an illumination device like, for example, a laser (as it is the case with the Philips Beard Trimmer 9000 device, which is equipped with a guidance laser casting a line on the face in use). Already a simple laser dot may provide relevant position information, while an extension to a laser line or an more complicated projection may be provided, from which orientation of the device with respect to the face is computable (also allowing for detecting of face curvature information). This can be further extended by applying temporally coded light suitable for camera base detection or spatially structured light for even more robust orientation detection in the projected pattern (e.g. augmented reality (AR) tag like shapes or refractive element projected shapes).
- a camera capturing the subject, while this might be a standard smartphone or tablet camera or any other camera e.g. built in to a smart mirror device.
- a processing unit as available in the smartphone or tablet may be used, if appropriately programmed, for (in particular real-time) detection and tracking of face features together with detecting and tracking the (clearly visible) controlled light image, e.g. a controlled dot.

The combination of tracking the device location and/or orientation in the context of the face provides options to detect and track where the device has applied its treatment. Immediate guidance can be provided (e.g. visualized) and the appliance can even be directly controlled based on this location and/or orientation information e.g. by automatically controlling comb-length, cutting elements or IPL timing.

Additionally, when applying a controlled (larger) spot with selected wavelengths, it can offer a controlled measurement with a remote camera in a repeatable way which is imperative for skin diagnostics.

In a preferred embodiment, the indicator detecting unit is arranged to detect an orientation of the indicator from a shape of the indicator and/or relative positions of multiple sub-indicators being portions of the indicator.

In a very simple implementation the light image projected by the mobile device is a dot, in other embodiments the light image is a line, rectangular projected image, temporarily coded light or spatially coded light is used for enhance positioning robustness.

In a preferred embodiment, the processing device further comprises an output unit arranged to output the determined position.

The output of the determined position or positional relation may be used, for example, by the mobile device itself for a control of a provided treatment based on the positional relation to the subject. In particular, the mobile device can be controlled (or control itself) based on the obtained position information and/or the usage pattern in a treatment cycle.

In a preferred embodiment, the processing device further comprises a tracking unit arranged to determine a track indicating the position of the mobile device over time, and/or a coverage unit arranged to determine an area or areas including the positions of the mobile device during one or more predetermined periods of time, while in a modification of this embodiment, the processing device additionally comprises a guidance unit arranged to compare a track determined by the tracking unit and/or an area or areas determined by the coverage unit with a predetermined track and/or a predetermined area or set of areas and to output guidance information indicative of a result of the comparison.

The invention thus allows, for example, for ensuring that predetermined portions of the face of the subject are addressed by the mobile device, e.g. in the context of beard trimming. Similarly, the invention may be used for checking whether in the course of tooth brushing all teeth are sufficiently brushed.

In a preferred embodiment, the processing device further comprises a status detecting unit arranged to determine a status of the mobile device from information in the received image and/or a series of received images. In a modification of this embodiment, the status detecting unit is arranged to determine the information from the detected indicator.

In order to communicate the status of the mobile device (e.g. use or non-use of a beard trimmer), the mobile device might be equipped with an optical output (as many personal care device are already conventionally are), wherein the image of the optical output may be used by the status detecting unit to determine the status of the mobile device. In addition or as an alternative, the indicator itself may be used for this purpose, e.g. by changing the color and/or shape of the indicator or by providing some other spatial or temporal encoding of the indicator.

It is to be noted that the status of the mobile device may also be communicated to the processing device, if needed, by other means, e.g. by a wireless or radio link between the mobile device and the processing device.

The status of the mobile device may also refer to positional information, attitude information or orientation information of the mobile device.

In an embodiment, one or more sensors are provided in or at the mobile device, wherein the processing device is arranged to receive data obtained by such sensor(s) and to employ the data or portions thereof in determining the position of the mobile device in relation to the subject.

Such sensor may be, for example, an accelerometer, a distance sensor or a touch or pressure sensor.

The use of an accelerometer allows for additional information on the attitude or orientation of the mobile device, either directly or by reference to an originally determined attitude or orientation and consideration of accelerations occurring in the meantime. Such additional information is particularly useful in case of limited information as to attitude or orientation derivable from the indicator (e.g. in case the indicator is a single dot rather than a pattern).

Information provided by a distance sensor allows for distinguishing between, for example, cases where the mobile device is touching the subject and where the mobile device is (just) hovering above the surface (or skin) of the subject.

Similarly, a touch or pressure sensor allows for such distinguishing, even though the touch sensor or pressure sensor may not provide additional information as to a distance beyond the extend of the touching or lack thereof.

The processing unit may be provided in the mobile device itself and may therefore receive data from the sensor in a more or less direct manner.

In case the processing unit is provided separately from the mobile device, a communication between the mobile device and the processing unit may be provided in a wireless form, e.g. by using Bluetooth, or by some other communication form. Data obtained by the mobile device may also be communicated by means of the indicator, e.g. by temporal encoding (e g blinking) and/or by spatial encoding (changing the form or number of sub-indicators etc.)

The term "body feature" is to be understood as referring to generic features of the body of the user, e.g., in the context of facial body features, as referring to landmarks like eyebrows, eyes, nose, month (corner) and/or chin. A generic feature is a feature which may generally assumed as being present across the population, like the landmarks mentioned above. In contrast, a specific face or skin feature is something that is not generally present across the population, but would be a visual feature present nevertheless for an individual, like for instance a scar, skin inflammation, mole etc. Glasses, jewelry or other features (like make-up or other markings) applied, for example, to a face may also considered, in broadest terms, as being visual features, while such features are not body features in the present context.

It is furthermore noted that the feature "detecting" is used here in the sense it is normally understood by a person skilled in the pertinent arts of computer vision and imaging pro-cessing. In contrast to the neighboring concept of "tracking", for detection the type or class of an object is to be described in such a way that it is distinguishable from other objects. One can, for instance, detect objects like, a bicycle, a cow, a human face, from the background. Such detection however, does not include distinguishing one bicycle from another bicycle. Tracking includes applies the strategy of repeatedly trying and detecting an object, while assuming that the detection in a spatially close location from the previous location found the same object. However, for tracking the object does not have to be of a certain type. Tracking can also be applied to a patch of pixels or (a part of) an object of which a visually similar patch is "searched" in the spatial vicinity in subsequent image frame (e.g. in optical flow or motion estimation).

For good order, it may be noted that the concept of "recognition" is not to be confused with that of "detection". A class detector for human faces can be considered an algorithm for recognizing that an image contains a picture of a human face. This, however, is not face recognition, though. The concept of "recognition" includes that one can (also) distinguish the subjects within the class. So for face recognition, for example, one might typically first have to detect that a patch of an image contains a human face and would next determine (recognize) which of the humans from a given database is shown in the picture.

In a preferred embodiment, the processing device further comprises an instruction unit arranged to determine a control instruction in accordance with the determined position of the mobile device and to output the control instruction in order to control an operation of the mobile device.

Such control instruction may, for example, be provided for adjusting parameters of a treatment provided by the mobile device. For example, based on the obtained position, in case of the mobile device being a shaving device, a rotation speed may be altered to improve the shaving performance and/or experience.

In a preferred embodiment, features of the subject used for the determination of the positional relationship are facial features of a user of the mobile device.

Facial features and their detecting in images have already been studied in great detail and multiple robust techniques for detecting facial features are available.

In a further preferred embodiment, the indicator is provided such that a surface curvature of the surface of the subject results in a distortion detectable by the processing device, so the processing device can derive a local surface curvature of the surface of the subject. This local surface curvature can be registered relative to the detected features (facial landmarks positions) and be used to generate a model of the (portion of) subject. With known curvatures leading to predictable distortions, the overall positioning determination by the processing unit can become more accurate as the model is created and updated.

Here, it is noted that the indicator detecting unit and the indicator detecting step of the present invention are preferably arranged such an indicator being more complex than a single dot may be detected largely regardless of a distortion thereof caused by a curvature of the subject's surface (or skin).

The invention also relates to an imaging device comprising an imaging unit arranged to provide an image showing at least a portion of a subject, and a processing device for determining the position of the mobile device in relation to the subject according the present invention, wherein the input unit of the processing device is arrange to receive the image from the imaging unit, wherein the imaging device is provided separately from the mobile device.

The invention further relates to a mobile device comprising an indicator unit arranged to project a signal on a subject and the processing device for determining the position of the mobile device in relation to the subject according to the invention.

Yet further, the invention relates to a system comprising an imaging device including an imaging unit arranged to provide an image showing at least a portion of a subject, and a mobile device including an indicator unit arranged to project a signal on an subject, wherein the imaging device and the mobile device jointly comprise the features of the processing device according to the present invention, wherein the imaging device is provided separately from the mobile device. It is not necessary that the features of the processing unit are exclusively provided in either of the imaging device and the mobile device, as also just the combination of the imaging device and mobile device together provides for the features of the processing device, i.e. that the units thereof are spread across the system including the imaging device and the mobile device.

In a preferred embodiment, the mobile device is arranged to provide a treatment to the subject and/or to obtain data information on a local condition of the subject.

In a further aspect of the present invention a computer program is presented for determining a position of a mobile device in relation to a subject, the software product comprising program code means for causing a processing device to carry out the steps of the method according to the invention when the software product is run on a processing device according to the invention.

It shall be understood that the processing device, the imaging device, the mobile device, the system, the method for determining a position of a mobile device in relation to a subject, and the computer program have similar and/or identical preferred embodiments, in particular, as defined in the dependent claims.

It shall be understood that a preferred embodiment of the invention can also be any combination of the dependent claims or above embodiments with the respective independent claim.

These and other aspects of the invention will be apparent from and elucidated with reference to the embodiments described hereinafter.

DETAILED DESCRIPTION OF THE EMBODIMENTS

Figure 1:
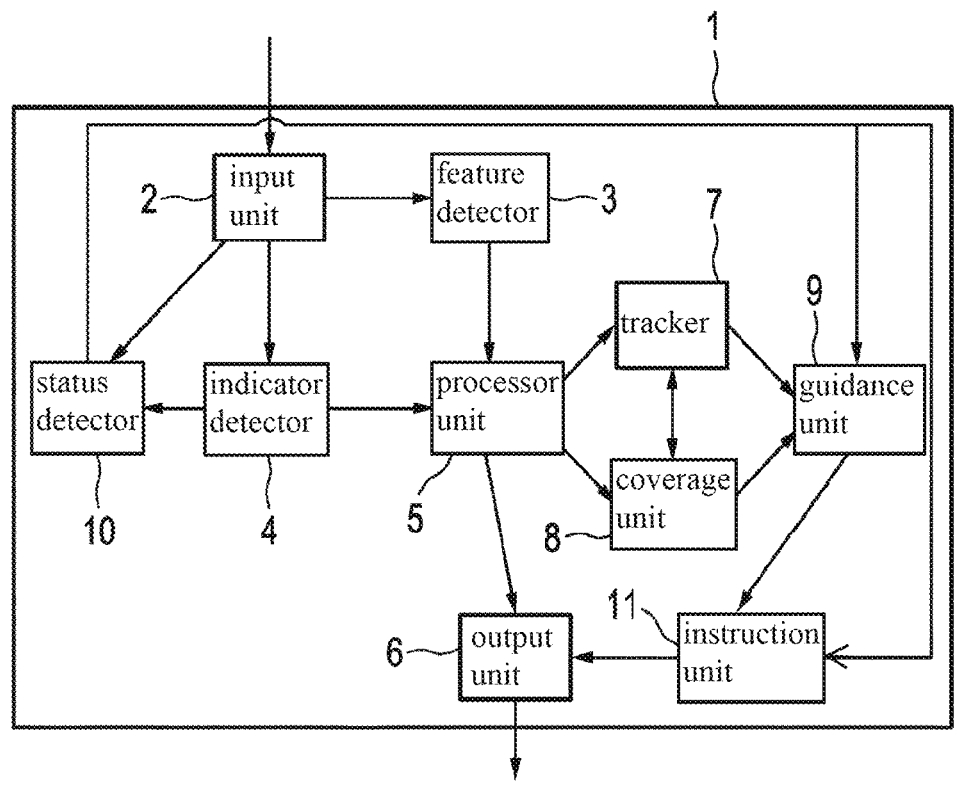
FIG. 1 schematically shows a processing device for determining a position of a mobile device in relation to a subject in accordance with an embodiment of the invention, FIG. 2 schematically shows an imaging device in accordance with another embodiment of the invention, FIG. 3 schematically shows a mobile device in accordance with another embodiment of the invention, FIG. 4 schematically shows a system including an imaging device and a mobile device in accordance with another embodiment of the invention.

FIG. 1 schematically shows a processing device 1 for determining a position of a mobile device (not shown) in relation to a subject (not shown) in accordance with an embodiment of the invention.

The processing device 1 includes an input unit 2, a feature detecting unit 3, an indicator detecting unit 4, a processing unit 5, an output unit 6, a tracking unit 7, a coverage unit 8, a guidance unit 9, a status detecting unit 10 and an instruction unit 11.

The input unit 2 is configured such that it may receive an image, the image showing at least a portion of the subject in relation to which the position of a mobile device is to be determined. The input unit forwards the image or at least portions thereof to the feature detecting unit 3, the indicator detecting unit 4 and the status detecting unit 10.

The feature detecting unit 3 is configured such that it is able to detect one or more features of the subject in the received image or portion thereof. Preferably the detected features are facial features or facial landmarks of the subject using the mobile device.

The skilled person is sufficiently familiar with detection of facial features and the like in images, so a further explanation in this respect may be omitted.

The feature detecting unit 3 is further arranged to forward information on the detected feature(s) to the processing unit 5.

The indicator detecting unit 4 is configured such that it is able to detect at least one indicator in the received image, where the indicator may be, for example, a laser dot or laser pattern projected by the mobile device on the subject.

Again, the skilled person is sufficiently familiar with the concept of detecting a particular pattern or dot in an image and therefore no further explanation is needed in this respect.

Similar to the feature detecting unit 3, also the indicator detecting unit 4 is arranged to forward information about the detected indicator(s) to the processing unit 5.

In addition, the indicator detecting unit 4 is arranged to forward information about the detected indicator to the status detecting unit 10, which also receives, as mentioned above, at least a portion of the received image. From the provided image and the information about the indicator, the status detecting unit of the present embodiment is arranged to determine a color of the indicator, which in turn indicates a status of the mobile device. The information about the status of the mobile device thus detected is forwarded by the status detecting unit to the guidance unit 9 and the instruction unit 11.

The processing unit 5 is configured such that it determines the position of the mobile device in relation to the subject by processing the detection results of the one or more detected features (provided by the feature detecting unit 3) and the detected indicator(s) (provided by the indicated detecting unit 4).

Depending on the particular configuration and the setting of the processing device, the information determined by the processing unit 5 is forwarded to the tracking unit 7, the coverage unit 8 and/or the output unit 6.

The tracking unit 7 is arranged to determine a track indicating the position of the mobile device in relation to the subject over time, i.e. to produce a series of data points indicating the position of the mobile device in relation to the subject. In parallel, the coverage unit 8 is arranged to determine an area or multiple areas including the positions of the mobile device during one or more predetermined portions of time. The tracking unit 7 and the coverage unit 8 cooperate in the present embodiment and the covered areas correspond to the track, where to each positional point a coverage area is provided and the resulting coverage areas are joined to determine the areas determined by the coverage unit 8. In this case, the coverage unit 8 is further arranged to provide time information together with the portions of the areas.

The information provided by the tracking unit 7 and the coverage unit 8 is forwarded to the guidance unit 9. The guidance unit 9 is in the present embodiment arranged to compare a track determined by the tracking unit and areas determined by the coverage unit with a predetermined track and predetermined areas, wherein the guidance unit 9 is further configured to output information indicative of the result of such comparison to the instruction unit 11. The guidance unit in this context uses the status information provided by the status detecting unit 10, such that only portions of the track(s) and areas or portions thereof are taking into consideration in which the status of the mobile device was active.

Provided with the guidance information, the instruction unit 11 is arranged to determine control instructions in accordance with the determined position of the mobile device and provide such control instruction to the output unit 6. The control instruction in this case includes appropriate indications of, for example, missing track portions or missing areas, in which, so far no treatment was provided by the mobile unit. In addition, the instruction unit is configured to monitor the status information provided by the status detecting unit and is arranged to provide instructions to the mobile device for switching on or of an active status of the mobile device in accordance with the positional relation between the mobile device and the subject. This may be used, for example, in case of a beard trimming such that the mobile device in form of a beard trimmer is only activated in portions of the user's face where a trimming is to be provided, while the beard trimmer is deactivated in other portions.

The output unit 6 is arranged to output the provided information to the outside, in particular to the mobile device (not shown).

Figure 2:
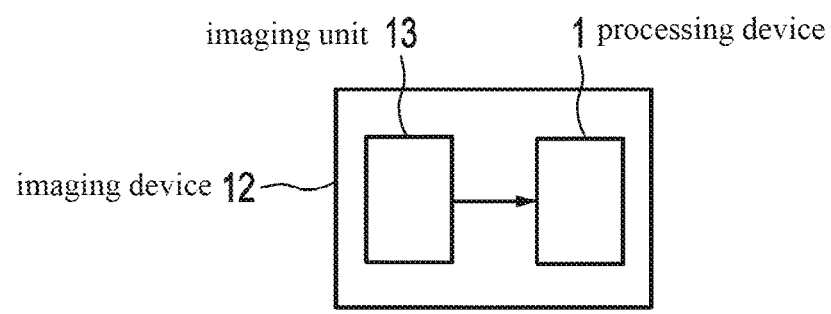

FIG. 2 schematically shows an imaging device 12 in accordance with another embodiment of the invention.

The imaging device 12 shown in FIG. 2 includes a processing device 1, as it is illustrated in FIG. 1 and an imaging unit 13.

The imaging unit 13 is provided to take an image or multiple images showing at least a portion of the subject (see FIG. 5) and to provide the taken image to the input unit of the processing device 1.

With respect to the details of the processing device 1, referral is made to the above explanation referring to FIG. 1.

Figure 3:
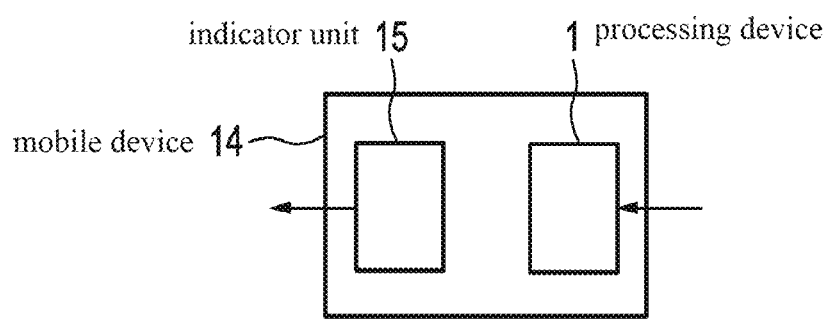

FIG. 3 schematically shows a mobile device in accordance with another embodiment of the invention.

The mobile device 14 includes an indicator unit 15 and a processing unit 1 in accordance with the above discussed embodiment.

The indicator unit 15 is arranged to project a signal, namely a laser dot or laser pattern, on the face of the subject, such that this laser dot or laser pattern can be recognized in an image taken of the subject. The processing device is arranged for receiving from the outside, e.g. from a separately provided camera (not shown) the image showing at least a portion of the subject including the projected signal.

Again, referral is made to FIG. 1 and the explanation given above with respect to the details of the processing device of also this embodiment.

Figure 4:
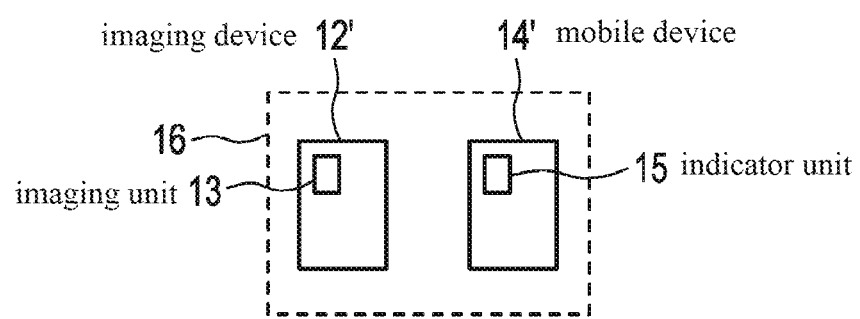

FIG. 4 schematically shows a system 16 including an imaging device 12' and a mobile device 14' in accordance with another embodiment of the invention.

Similar to the imaging device discussed with respect to FIG. 2 and the mobile device discussed with respect to FIG. 3, respectively, the imaging device 12' includes an imaging unit 13 and the mobile device 14' includes an indicator unit 15.

However, contrary to the situation illustrated in FIG. 2 or FIG. 3, the elements of the processing device shown, for example, in FIG. 1 are, in the system 16 of FIG. 4 not exclusively provided either in the imaging device 12' or in the mobile device 14'. In fact, the elements as shown in FIG. 1 are included in the system 16 without being accumulated in one of the devices 12', 14'. In other words, the elements of the processing device are spread or distributed across the devices 12' and 14'.

Figure 5:
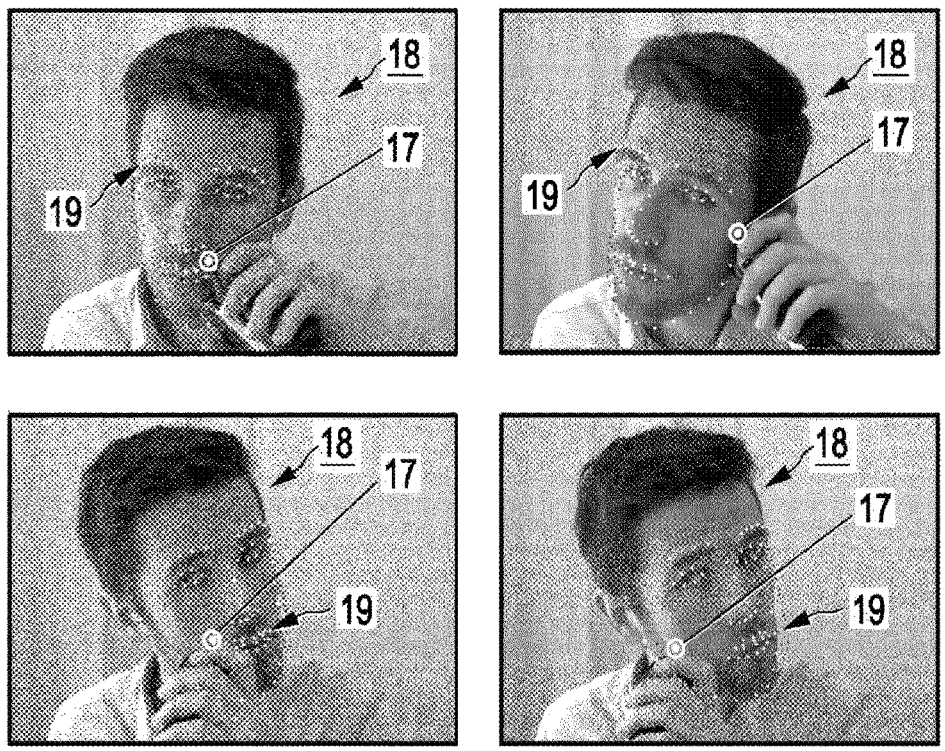
FIG. 5 shows exemplary images showing a subject with a mobile device projecting an indicator on the subject's face in accordance with an embodiment of the present invention.

FIG. 5 shows exemplary images showing a subject 18 with a mobile device (mostly blocked in the images) projecting an indicator 17 on the subject's face in accordance with an embodiment of the present invention.

The mobile device here is a beard trimmer, which projects a laser dot 17 on the face of the user 18. In addition, facial landmarks or features 19 are highlighted in the pictures, even though it is to be noted that no such highlighting is actually necessary in the context of the present invention, as long as the underlying information is obtained by the features detecting unit.

Figure 6:
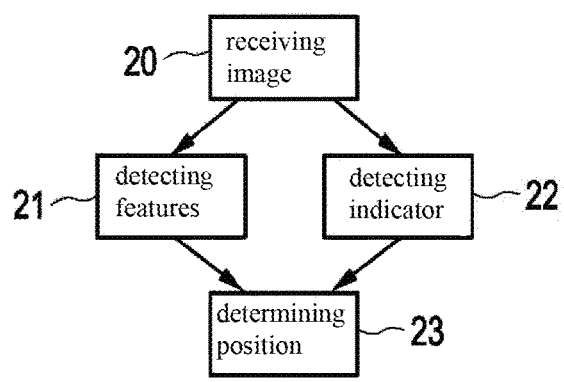
FIG. 6 shows a schematic flow diagram illustrating a method for determining a position of a mobile device in relation to a subject.

FIG. 6 shows a schematic flow diagram illustrating a method for determining a position of a mobile device in relation to a subject. In a receiving step 20, an image showing at least a portion of the subject is received, followed by two detecting steps 21, 22, a feature detecting step in which one or more features of the subject are detected in the received image and an indicator detecting step 22, in which the indicator provided by the mobile device on the subject is detected. Following the detection step 21, 22, there is provided a position determining step 23, in which the position of the mobile device in relation to the subject is determined by processing the detection results of the feature detecting step 21 and the indicator detecting step 22.

While the invention has been illustrated and described in detail in the drawings and foregoing description, such illustration and description are to be considered illustrative or exemplary and not restrictive; the invention is not limited to the disclosed embodiments.

Other variations to the disclosed embodiments can be understood and effected by those skilled in the art in practicing the claimed invention, from a study of the drawings, the disclosure, and the appended claims.

This invention can be applied to any product where relative position of the device to another surface is relevant. Any controlled-skin-measurement-application is possible. The application is not limited to the combination of a smart device and appliance. A smart mirror like device with a camera will also be a suitable platform. The collected data over time might provide statistics of how you have been using the appliance.

This invention is not limited to a laser guide line, but becomes especially useful when a dedicated spot is illuminating skin regions, allowing controlled capturing of face features. The invention becomes even more robust when applying special and/or temporal encoding in this illumination, which can provide detailed personal skin measurements. The invention is particularly intended for shaving and grooming devices but it can be applied to any personal care device and related or comparable areas.

In the claims, the word "comprising" does not exclude other elements or steps, and the indefinite article "a" or "an" does not exclude a plurality.

A single processor, device or other unit may fulfill the functions of several items recited in the claims. The mere fact that certain measures are recited in mutually different dependent claims does not indicate that a combination of these measures cannot be used to advantage.

Operations like detecting, determining, outputting, and comparing can be implemented as program code means of a computer program and/or as dedicated hardware.

A computer program may be stored and/or distributed on a suitable medium, such as an optical storage medium or a solid-state medium, supplied together with or as part of other hardware, but may also be distributed in other forms, such as via the Internet or other wired or wireless telecommunication systems.

Any reference signs in the claims should not be construed as limiting the scope.

The invention claimed is:

1. A processing device for determining a position of a mobile device in relation to a subject, the processing device comprising:
   an input unit arranged to receive an image showing at least a portion of the subject, the image being taken by an imaging device provided separately from the mobile device;
   a feature detecting unit arranged to detect one or more body features of the subject in the image;
   an indicator detecting unit arranged to detect an indicator in the image, the indicator being a signal projected by the mobile device on the subject; and
   a processor configured to determine the position of the mobile device in relation to the subject directly by processing data consisting of the detected one or more body features and the detected indicator.

2. The processing device according to claim 1, wherein the indicator detecting unit is arranged to detect an orientation of the indicator from a shape of the indicator.

3. The processing device according to claim 1, further comprising:
   an output unit arranged to output the determined position.

4. The processing device according to claim 1, further comprising:
   a tracking unit arranged to determine a track indicating the position of the mobile device over time, and
   a coverage unit arranged to determine at least one area including positions of the mobile device during one or more predetermined periods of time.

5. The processing device according to claim 4, further comprising:

a guidance unit arranged to compare the track determined by the tracking unit and the at least one area determined by the coverage unit with a predetermined track and a predetermined area or set of areas and to output guidance information indicative of a result of the comparison.

6. The processing device of claim 4, further comprising a guidance unit arranged to compare the at least one area determined by the coverage unit with a predetermined area and to output guidance information indicative of a result of the comparison.

7. The processing device of claim 4, further comprising:
a status detecting unit arranged to determine a status of the mobile device from information in the image, wherein the status indicates whether the mobile device is active; and
a guidance unit arranged to compare only portions of the track where the status indicates the mobile device is active and/or only portions of the at least one area where the status indicates the mobile device is active with a predetermined track and/or a predetermined area and to output guidance information indicative of a result of the comparison.

8. The processing device according to claim 1, further comprising:
a status detecting unit arranged to determine a status of the mobile device from information in the image and/or a series of received images, wherein the status indicates whether the mobile device is active.

9. The processing device according to claim 8, wherein the status detecting unit is arranged to determine the information from the detected indicator.

10. The processing device according to claim 1, further comprising:
an instruction unit arranged to determine a control instruction in accordance with the determined position of the mobile device and to output the control instruction in order to control an operation of the mobile device.

11. The processing device according to claim 1, wherein the detected one or more body features of the subject are facial features of a user of the mobile device.

12. An imaging device, comprising:
an imaging unit arranged to provide an image showing at least a portion of a subject; and
the processing device for determining the position of the mobile device in relation to the subject according to claim 1, wherein the input unit of the processing device is arranged to receive the image from the imaging unit, wherein the imaging device is provided separately from the mobile device.

13. A mobile device, comprising:
an indicator unit arranged to project the signal on the subject; and
the processing device for determining the position of the mobile device in relation to the subject according to claim 1.

14. The processing device of claim 1, wherein the indicator detecting unit is arranged to detect an orientation of the indicator from a shape of the indicator and relative positions of multiple sub-indicators being portions of the indicator.

15. The processing device of claim 1, wherein the feature detecting unit is arranged to highlight the detected one or more body features of the subject in the image.

16. The processing device of claim 1, wherein the indicator indicates a changing status of the mobile device by one of changing a color of the indicator, changing a shape of the indicator, temporal encoding including blinking of the indicator, and spatial encoding including changing a number of sub-indicators.

17. A system, comprising:
an imaging device including an imaging unit arranged to provide an image showing at least a portion of a subject;
a mobile device including an indicator unit arranged to project a signal on the subject; and
a processing device for determining a position of the mobile device in relation to the subject, the processing device comprising:
an input unit arranged to receive an image showing at least a portion of the subject, the image being taken by an imaging device provided separately from the mobile device:
a feature detecting unit arranged to detect one or more body features of the subject in the image;
an indicator detecting unit arranged to detect an indicator in the image, the indicator being a signal projected by the mobile device on the subject; and
a processor configured to determine the position of the mobile device in relation to the subject directly by processing data consisting of the detected one or more body features and the detected indicator,
wherein the imaging device and the mobile device jointly comprise features of the processing device, and
wherein the imaging device is provided separately from the mobile device.

18. The system according to claim 17,
wherein the mobile device is arranged to provide a treatment to the subject and/or to obtain data information on a local condition of the subject.

19. A method for determining a position of a mobile device in relation to a subject, comprising acts of:
receiving an image showing at least a portion of the subject, the image being taken by an imaging device provided separately from the mobile device;
detecting one or more body features of the subject in the image;
detecting at least one indicator in the image, the indicator being a signal projected by the mobile device on the subject; and
determining the position of the mobile device in relation to the subject directly by processing data consisting of the detected one or more body features and the detected indicator.

20. A non-transitory computer readable medium comprising computer instructions which, when executed by a processor, configure the processor to cause performance the acts of the method as claimed in claim 19.

* * * * *